United States Patent
Krushel et al.

(10) Patent No.: US 11,831,268 B2
(45) Date of Patent: Nov. 28, 2023

(54) VEHICLE DOOR CHECKER USING POWER DRIVE UNIT AND DC MOTOR COGGING EFFECT

(71) Applicant: Multimatic Inc., Markham (CA)

(72) Inventors: Kelsey Dale Krushel, Uxbridge (CA); Tomasz Tadeusz Dominik, Newmarket (CA)

(73) Assignee: MULTIMATIC INC., Markham (CA)

( * ) Notice: Subject to any disclaimer, the term of this patent is extended or adjusted under 35 U.S.C. 154(b) by 151 days.

(21) Appl. No.: 17/609,329

(22) PCT Filed: Jun. 25, 2020

(86) PCT No.: PCT/US2020/039544
§ 371 (c)(1),
(2) Date: Nov. 5, 2021

(87) PCT Pub. No.: WO2020/264107
PCT Pub. Date: Dec. 30, 2020

(65) Prior Publication Data
US 2022/0149757 A1    May 12, 2022

Related U.S. Application Data

(60) Provisional application No. 62/866,086, filed on Jun. 25, 2019.

(51) Int. Cl.
*E05F 15/00* (2015.01)
*H02P 3/02* (2006.01)
*E05F 15/63* (2015.01)

(52) U.S. Cl.
CPC .............. *H02P 3/025* (2013.01); *E05F 15/63* (2015.01); *E05Y 2201/218* (2013.01);
(Continued)

(58) Field of Classification Search
CPC .. H02P 3/00; H02P 3/025; E05F 15/00; E05F 15/63; E05F 15/662; E05Y 2201/00;
(Continued)

(56) References Cited

U.S. PATENT DOCUMENTS 9,062,488 B2 * 6/2015 Sasaki .................. E05F 15/611
10,612,288 B2 * 4/2020 Rietdijk ................. F16D 51/00
(Continued)

FOREIGN PATENT DOCUMENTS

DE    202008015420 U1    2/2009
DE    102011115162 A1    3/2013
(Continued)

OTHER PUBLICATIONS

International Search Report for International Application No. PCT/US2020/039544 dated Oct. 22, 2020.
(Continued)

*Primary Examiner* — Chi Q Nguyen
(74) *Attorney, Agent, or Firm* — Carlson, Gaskey & Olds, P.C.

(57) ABSTRACT

A vehicle door checker integrated with a power drive unit for an automobile door includes a direct current permanent magnet electric motor subject to cogging torque. The electric motor includes a central shaft. The vehicle door checker also includes a cogging torque increase device that is mounted to the central shaft externally of the motor. The cogging torque increase device includes pairs of oppositely magnetized permanent magnets that are mounted coaxially in a stator and rotor respectively about the motor shaft. The stator magnets and the rotor magnets shift into and out of alignment with each other as the shaft is rotated such that the motor is held in multiple discrete stable positions that correspond to check positions of an automobile door.

5 Claims, 10 Drawing Sheets

(52) U.S. Cl.
CPC ... *E05Y 2201/246* (2013.01); *E05Y 2201/258* (2013.01); *E05Y 2201/418* (2013.01); *E05Y 2201/438* (2013.01); *E05Y 2201/442* (2013.01); *E05Y 2201/46* (2013.01); *E05Y 2201/626* (2013.01); *E05Y 2201/702* (2013.01); *E05Y 2201/72* (2013.01); *E05Y 2900/531* (2013.01)

(58) Field of Classification Search
CPC ......... E05Y 2201/218; E05Y 2201/246; E05Y 2201/258; E05Y 2201/40; E05Y 2201/418; E05Y 2201/43; E05Y 2201/462; E05Y 2201/442; E05Y 2201/46; E05Y 2201/626; E05Y 2201/702; E05Y 2201/706; E05Y 2201/72; E05Y 2900/531
See application file for complete search history.

(56) References Cited

U.S. PATENT DOCUMENTS

| | | | | |
|---|---|---|---|---|
| 10,633,906 | B2* | 4/2020 | Rietdijk | F16H 19/0628 |
| 10,982,721 | B2* | 4/2021 | Oosawa | F16D 3/54 |
| 2008/0245636 | A1* | 10/2008 | Gotou | H02K 7/108 |
| | | | | 192/103 R |
| 2009/0265992 | A1* | 10/2009 | Hass | E05F 15/63 |
| | | | | 318/610 |
| 2012/0176075 | A1* | 7/2012 | Taka | G05B 19/27 |
| | | | | 318/685 |
| 2015/0022044 | A1 | 1/2015 | Chowdhury et al. | |
| 2017/0089118 | A1* | 3/2017 | Li | H02K 1/2753 |
| 2017/0248183 | A1 | 8/2017 | Strobel | |
| 2019/0032387 | A1 | 1/2019 | Wölker | |
| 2020/0204037 | A1* | 6/2020 | Uchimura | H02K 7/1166 |
| 2020/0290666 | A1* | 9/2020 | Oosawa | F16D 3/54 |
| 2020/0340557 | A1* | 10/2020 | Jensch | F16H 25/20 |
| 2020/0369315 | A1* | 11/2020 | Honda | F16D 3/74 |
| 2020/0373809 | A1* | 11/2020 | Uchimura | F16H 55/08 |

FOREIGN PATENT DOCUMENTS

| | | |
|---|---|---|
| EP | 2902578 A2 | 8/2015 |
| JP | 2001-136718 A | 5/2001 |
| JP | 2005256470 A | 9/2005 |
| JP | 2007257281 A | 10/2007 |
| JP | 2014-163106 A | 9/2014 |
| JP | 2015-143415 A | 8/2015 |
| WO | 2016164023 A1 | 10/2016 |

OTHER PUBLICATIONS

International Preliminary Report on Patentability for International Application No. PCT/US2020/039544 dated Aug. 24, 2021.
Chinese Office Action for Chinese Patent Application No. 202080044938.7 dated Oct. 11, 2022.
Japanese Office Action for Japanese Application No. 2021-577023 dated Jun. 13, 2023.

* cited by examiner

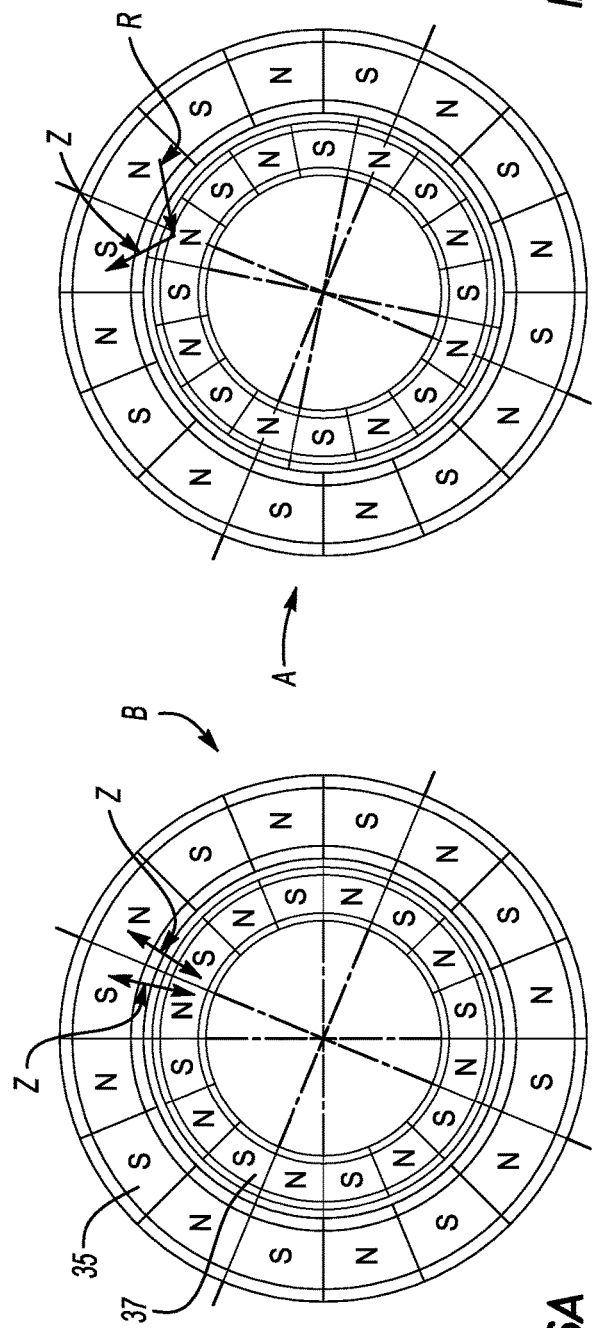
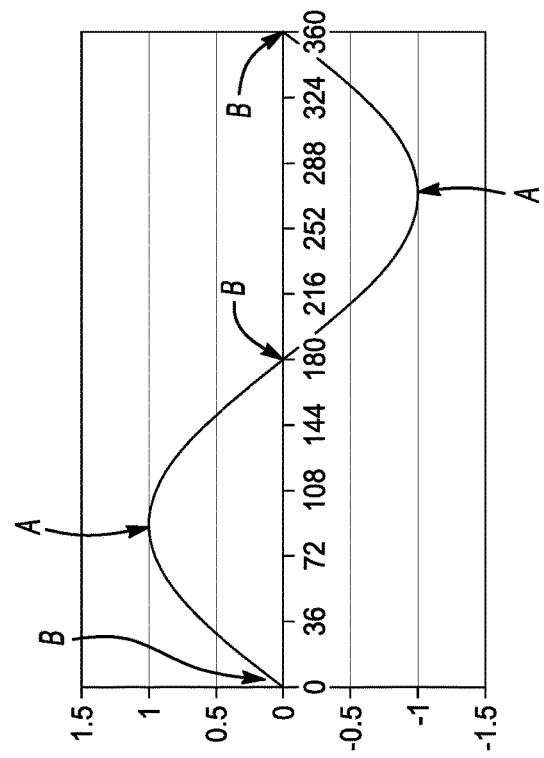

ature in such stopped positions to prevent a door from swinging when subjected to forces less than those desired to remove the door from a check position. Using a larger motor with more mass and resistance to such forces adds cost and weight. Also, such motors may be back-driven if sufficient force is applied. Accordingly, it would be desirable to have a means to enhance the door checking ability of a conventional DC motor without significantly increasing its size, weight and cost.

VEHICLE DOOR CHECKER USING POWER DRIVE UNIT AND DC MOTOR COGGING EFFECT

CROSS-REFERENCE TO RELATED APPLICATIONS

This application claims priority to U.S. Provisional Application No. 62/866,086 which was filed on Jun. 25, 2019, and is incorporated herein by reference.

BACKGROUND

In modern automobiles, there is an emphasis on automation, convenience, efficiency and weight reduction. One field of innovation involves door checkers. There is virtually always a need to hold automobile passenger doors temporarily open at discrete positions. Such positions facilitate driver and passenger ingress and egress from the vehicle, particularly where the space to open the door is restricted, such as by other cars in a parking lot or other obstructions. Door checkers are used for this purpose. Through mechanical friction, spring loaded elements engage other elements which move with door motion to create discrete check positions at detents.

Mechanical door checkers are highly functional and have been proven over many years. They do, however, add a certain amount of weight to the vehicle and must be carefully mounted to facilitate smooth door operation. In addition, over many cycles, they can wear and become less efficient. Accordingly, a door checker which reduces or avoids mechanical frictional wear would be advantageous. Also, reducing the size of the door checker provides advantages in vehicle design since the packaging space needed to locate such a device is decreased.

Another area of innovation motivated by convenience and automation involves powered door opening and closing. Door power drive units typically employ direct current (DC) electric motors. Permanent magnet electric motors are subject to a phenomenon known as cogging. Cogging is a periodic slowing down, hesitancy or ripple effect during each revolution of an electric motor owing to shifting, asymmetrical electric and magnetic fields. Cogging is most noticeable when no power is supplied to the motor. Cogging in electric motors is generally seen as a negative effect since motors subject to cogging do not produce a continuous, smooth force profile or torque. In some cases, an electric motor will stall at a cog position if the motive force is insufficient to overcome the resistance caused by the cogging effect. Cogging also tends to affect motor output negatively and may lead to vibration and noise. Cogging may be reduced by increasing the number of coils or windings, and corresponding commutators, to even out the force profile during motor operation. Employing an unequal number of magnets and rotor teeth, in a non-integral ratio (i.e. not 1:1, 2:1, 3:1, etc.), also effectively eliminates the cogging problem. Skewing the stator magnets and rotor teeth can also reduce the cogging effect by tending to spread out and neutralize the resistive cogging forces. Accordingly, in order to increase efficiency of electric motors, the bulk of research and development with respect to the cogging effect has been focused on reducing it.

A conventional DC electric motor may be used to drive a mechanical system to open and close a vehicle door. With appropriate electronic control, such a motor may be stopped at discrete positions to obtain a door checking effect. Such motors, however, generally will not produce sufficient resis-

SUMMARY

Enhancing the cogging effect of a DC permanent magnet motor, or choosing such a motor with inherent cogging torque, permits the motor to enhance the door checking effect achieved simply by powering the more efficient motor to discrete positions. Thus, a vehicle door may be held in position by the resistive torque of the DC motor known as the cogging torque. When the electric motor drives a gear system to actuate a mechanical link to move the door, the cogging torque is increased by the gear train ratio and efficiency. This produces a sufficient resistance to maintain the position of the door when not subject to significant external opening or closing forces. This resistance is known as the back-drive torque. In some situations, however, such as extreme vehicle orientations or wind gusts, the cogging torque of the motor will be insufficient to hold the position of the door.

It has been found that by adding an extra cogging element, or cogging torque increase device, the cogging effect of the DC motor can be enhanced. This device increases the cogging torque of the DC motor by adding pairs of magnets coaxially with the motor shaft. The motor is the most desirable place to add additional cogging torque since, like that of the DC motor itself, the torque is multiplied by the gear ratio and gear train efficiency. In a preferred embodiment, oppositely magnetized permanent magnets are arranged on an external stator and internal rotor mounted coaxially to the electric motor shaft at either end of the motor. When the oppositely magnetized pairs of magnets are aligned, the magnets are attracted to each other and the position of the cogging torque increase device is stable. This corresponds to a checked door position since force is required to move the torque increase device from its stable position. Cogging torque is generated by displacing the magnets from their aligned positions as the motor shaft is rotated. Such magnet misalignment results in an unstable position of the torque increase device. This corresponds to a door position between checked positions. When the force that is acting to move the door and in turn rotate the motor out of the checked position is removed, the motor rotates back to the stable and checked position. The external magnets can be aligned to the DC motor to increase the cogging torque of the system.

In an alternative configuration, multi-pole magnets may be used in the cogging torque increase device. These may comprise a stationary, multi-pole outer magnet and a rotating multi-pole inner magnet. Again, as oppositely charged poles align and attract during rotation of the motor shaft, the device position is stable. When the oppositely charged poles are misaligned, and conversely align with same-charged poles causing them to repel, the device position is unstable.

By choosing an appropriate gear ratio for the mechanical system driven by the electric motor, a small displacement of the door may result in a significant rotation of the torque increase device. Thus, there may be a very small increment between potential door check positions. From the perspective of the user, the door checking is essentially infinite. Practically, this means that the door can be checked at virtually any position within its desired range of motion.

In a principal aspect of the invention, a vehicle door checker integrated with a power drive unit for an automobile door comprises a direct current permanent magnet electric motor comprising a central shaft, a cogging torque device mounted to the central shaft externally of the motor, the cogging torque increase device comprising pairs of oppositely magnetized permanent magnets mounted coaxially about the shaft wherein the pairs of coaxial magnets shift into and out of alignment with each other as the shaft is rotated such that the motor is held in multiple discrete stable positions corresponding to check positions of an automobile door.

In a further aspect of the invention, the vehicle door checker with integrated power drive unit further comprises a gear system driven by the central shaft, at least one lever arm rotated by the gear system, and a link arm which reciprocates under the control of the lever arm to open and close the vehicle door.

In a further aspect of the invention, the oppositely magnetized pairs of magnets are located respectively on a multi-pole stationary outer magnet and a multi-pole rotating inner magnet.

BRIEF DESCRIPTION OF THE DRAWINGS

The disclosure can be further understood by reference to the following detailed description when considered in connection with the accompanying drawings wherein:

FIG. 16A is a schematic representation of external and internal multi-pole magnets in an alternative embodiment of the cogging device showing the attractive force between aligned opposing oppositely magnetized segments generating cogging force B.

FIG. 16B is a schematic representation of external and internal multi-pole magnets in the alternative embodiment of the cogging device showing the attractive and repulsive forces between misaligned oppositely magnetized segments generating cogging force A.

FIG. 16C illustrates the torque generated with the multi-pole magnets in the orientations illustrated in FIGS. 16A and 16B.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

An illustrative embodiment of the invention may be described with reference to the drawings.

Figure 1:
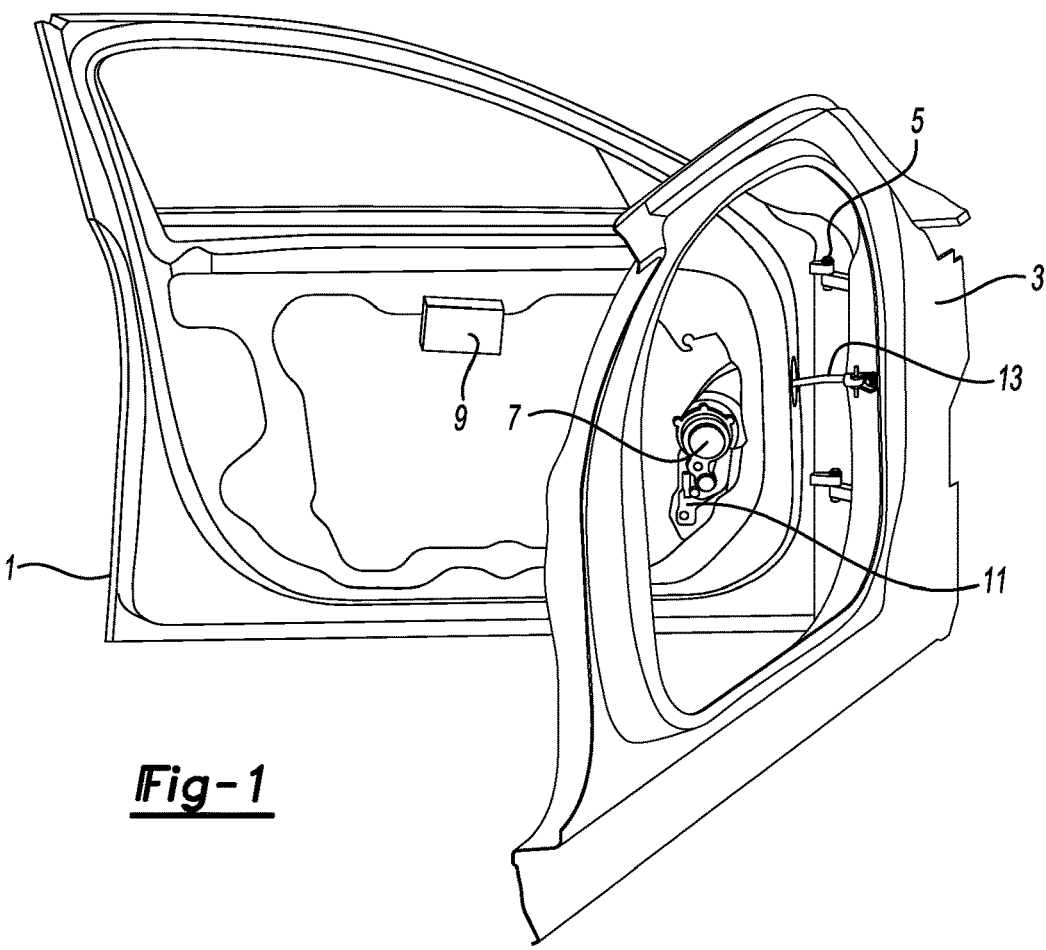
FIG. 1 is a schematic cutaway perspective view of an automotive side door and body pillar joined by hinges and configured to open and close using a power drive unit with a DC electric motor.

Referring to FIG. 1, an automotive door system comprises a door 1 rotationally mounted to a body pillar 3 via hinges 5. The door 1 may be automatically opened and closed by means of a power drive unit 7 under the operation of a control unit 9. The power drive unit 7, driven by a DC electric motor 11, causes a link rod 13 to move the door 1 from fully closed to fully open and to various positions there between. The power drive unit 7 also maintains the door 1 in these various orientations.

Figure 2:
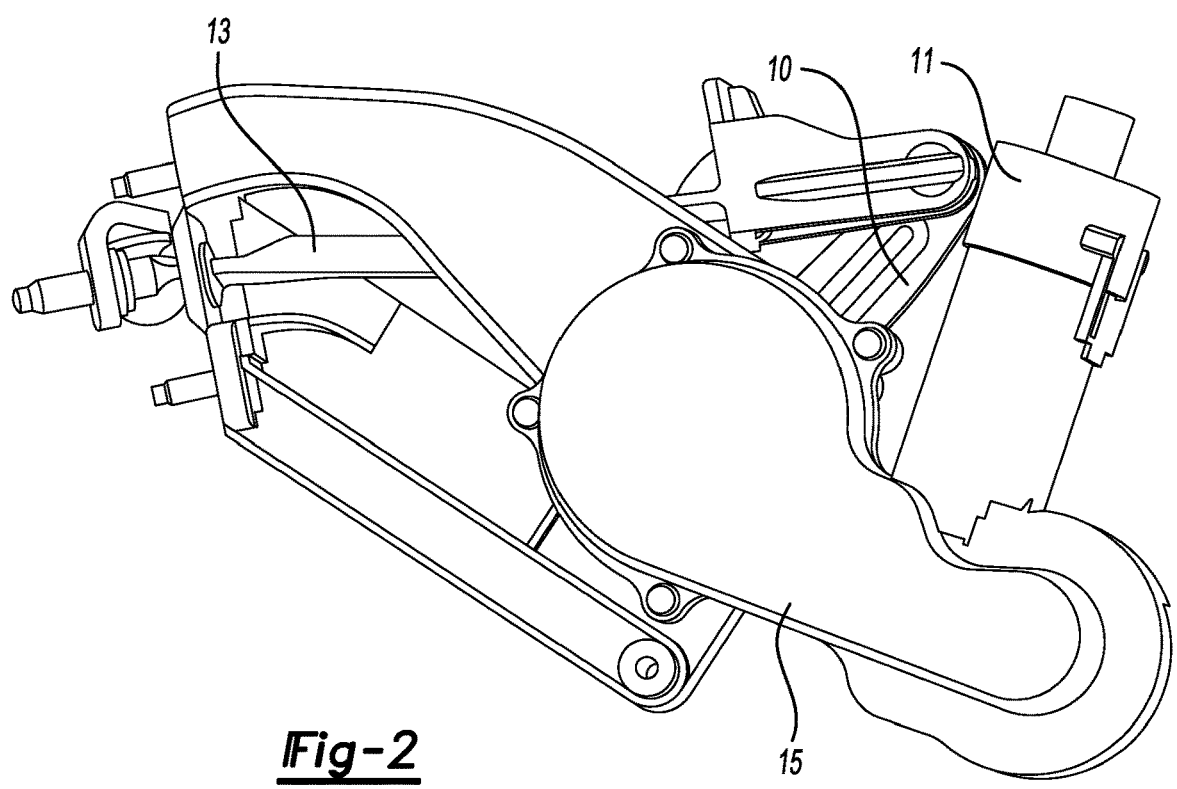
FIG. 2 is a schematic perspective view of the power drive unit DC electric motor, a gear assembly and a link rod.
Figure 3:
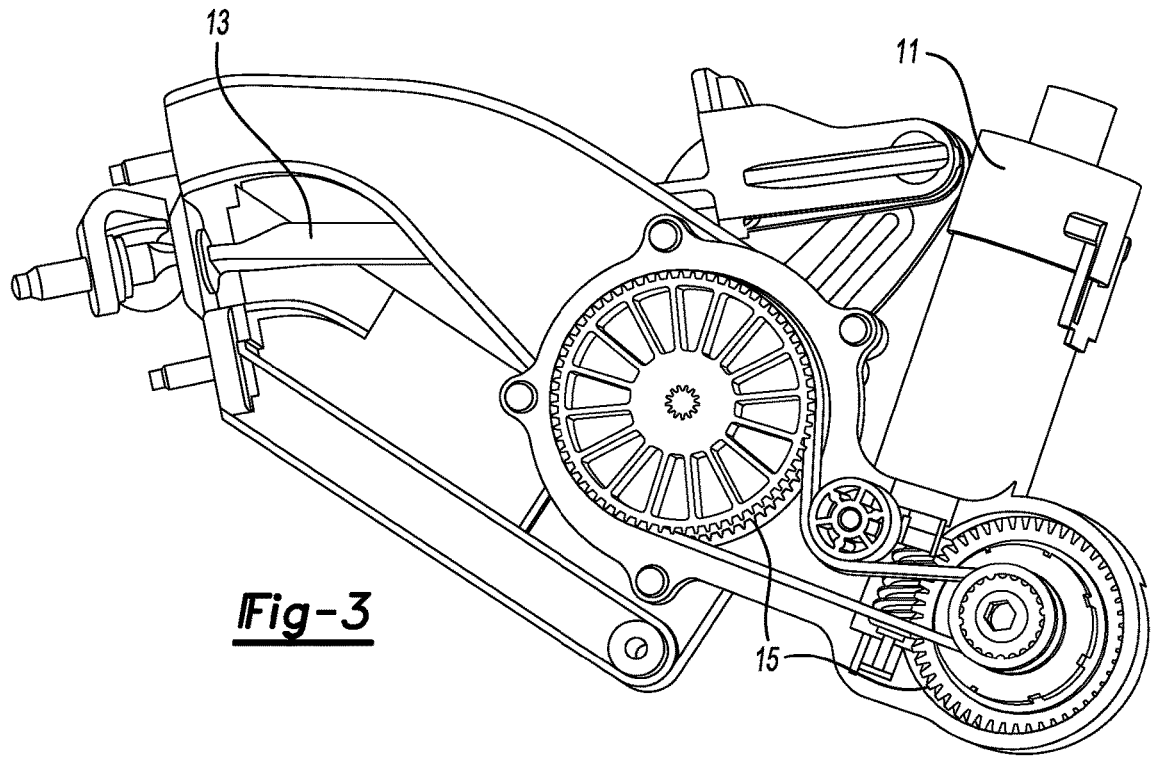
FIG. 3 is a schematic perspective partially cutaway view of the power drive unit showing the gear train in further detail.
Figure 4:
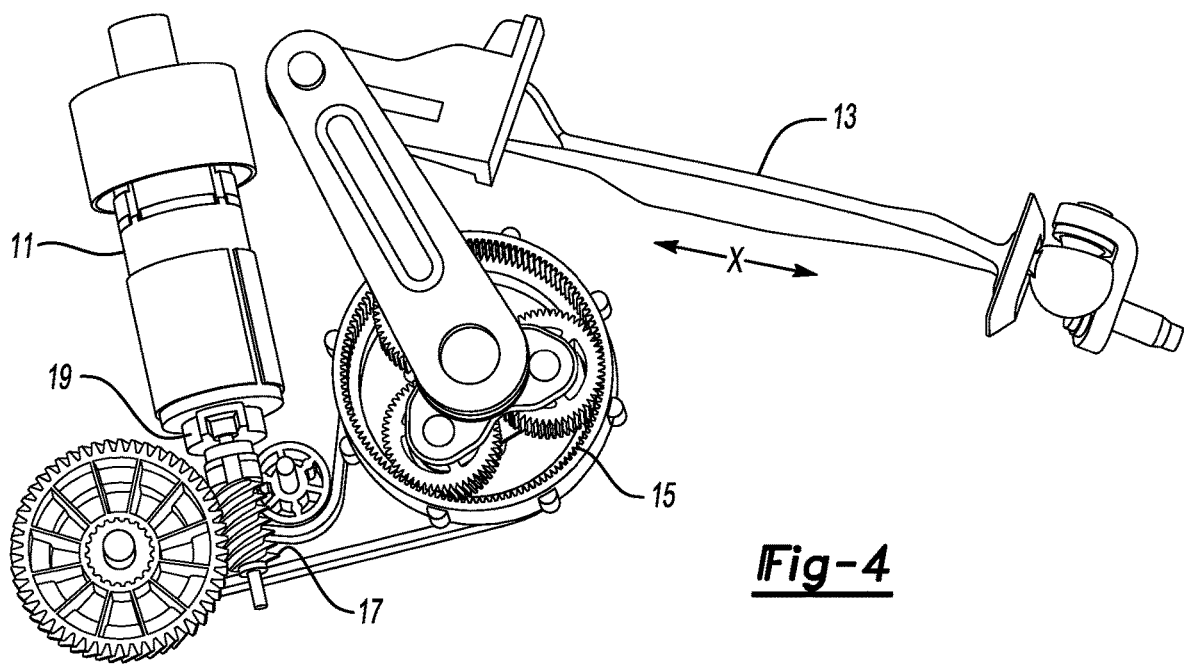
FIG. 4 is a schematic perspective partially cutaway view of the DC motor with an intermediate cogging device driving the gear train and the reciprocating link rod.
Figure 5A:
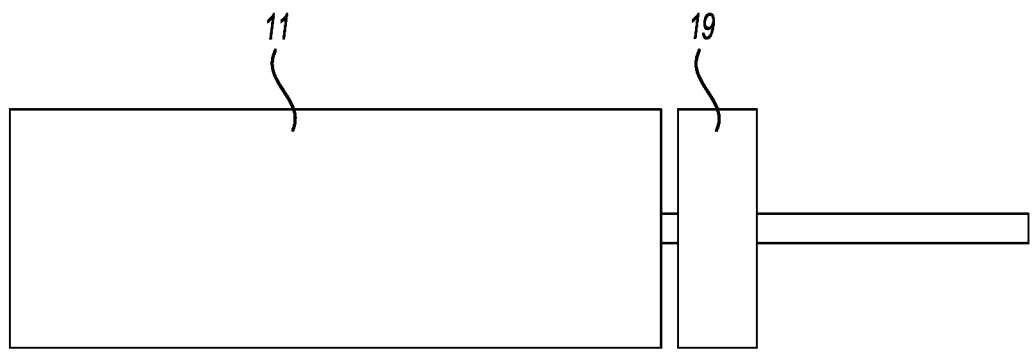
FIGS. 5A and 5B are schematic elevation views showing the cogging device mounted to either end of the DC motor.
Figure 5B:
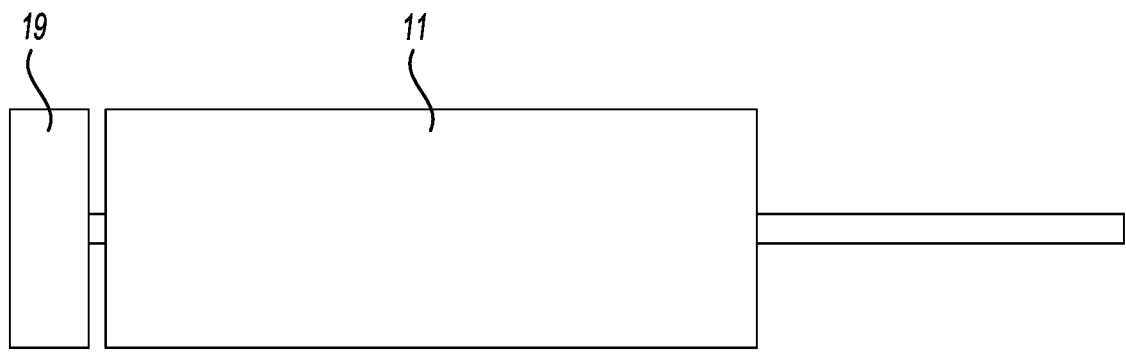

Referring to FIGS. 2, 3 and 4, the link rod 13 is driven back and forth to control the position of the door 1 by the DC electric motor 11 which is connected to the link rod 13 via a lever arm 10 and a gear train 15. A worm gear 17 driven by the electric motor 11 advantageously drives the gear train 15. The reciprocating movement of the link rod 13 is represented by the letter X and the arrows in FIG. 4. A cogging device 19 may be located between the electric motor 11 and the gear train 15, as illustrated schematically in FIG. 5A, or may alternatively be located at the distal end of the motor 11, as illustrated in FIG. 5B. The door 1 is held in position by a resistive torque from the DC motor 11 known as cogging torque. This torque is increased by the gear train ratio and efficiency of the gear train 15, which may be tuned to achieve the desired effect, to produce a sufficient resistance to maintain the selected position of the door 1. This resistance is known as the back-drive torque, or the torque sufficient to drive the electric motor 11 in a reverse direction.

Figure 6:
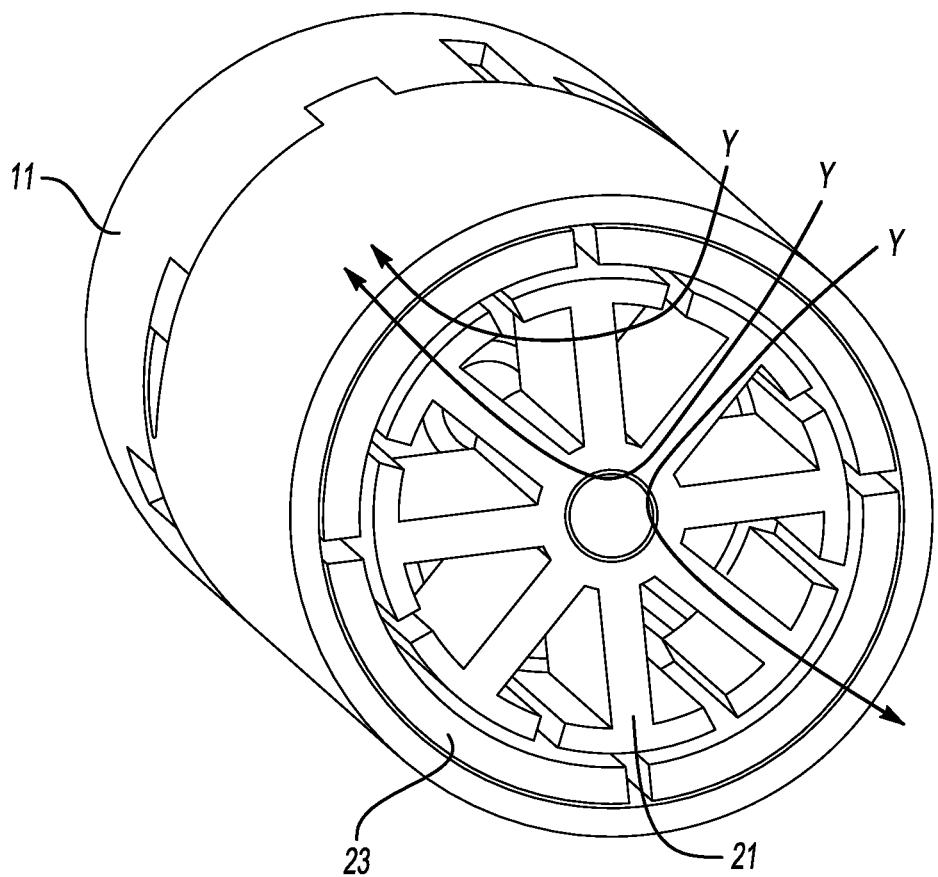
FIG. 6 is a perspective view of the DC motor showing its rotor, stator and magnetic flux lines.
Figure 7:
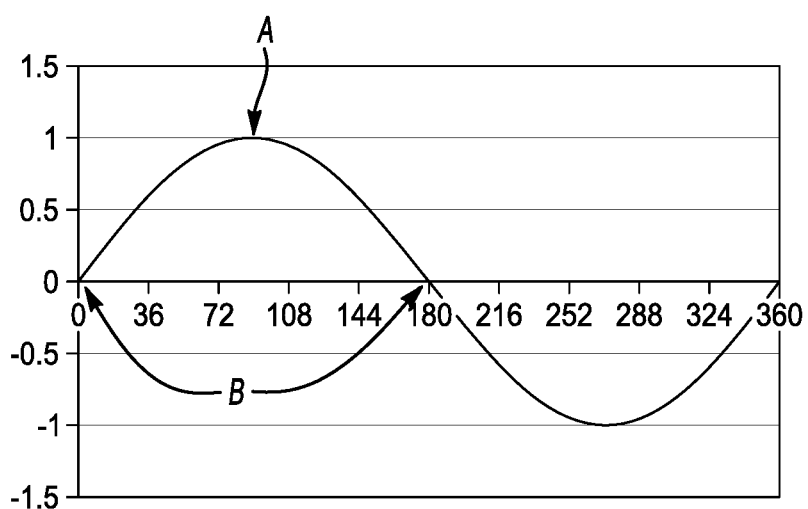
FIG. 7 shows the maximum cogging effect A and the minimum cogging effect B generated by the DC motor.

A typical DC permanent magnet electric motor 11 is illustrated in FIG. 6 in a stable position. The rotor 21 is aligned with the magnetic field produced by the stator 23 comprising four permanent magnets in this configuration. Magnetic flux lines Y are shown schematically. The torque required to rotate the rotor 21 from this stable position is called the cogging torque. FIG. 7 illustrates a notional generated torque of zero at the stable position and a notional cogging torque of 1.0 with the rotor and stator at the point of maximum misalignment of the magnetic fields.

In some situations such as extreme vehicle orientations, however, the cogging torque of the motor 11 is not sufficient to hold the door 1 in its selected position. In these circumstances, a higher cogging torque is desirable.

Figure 8:
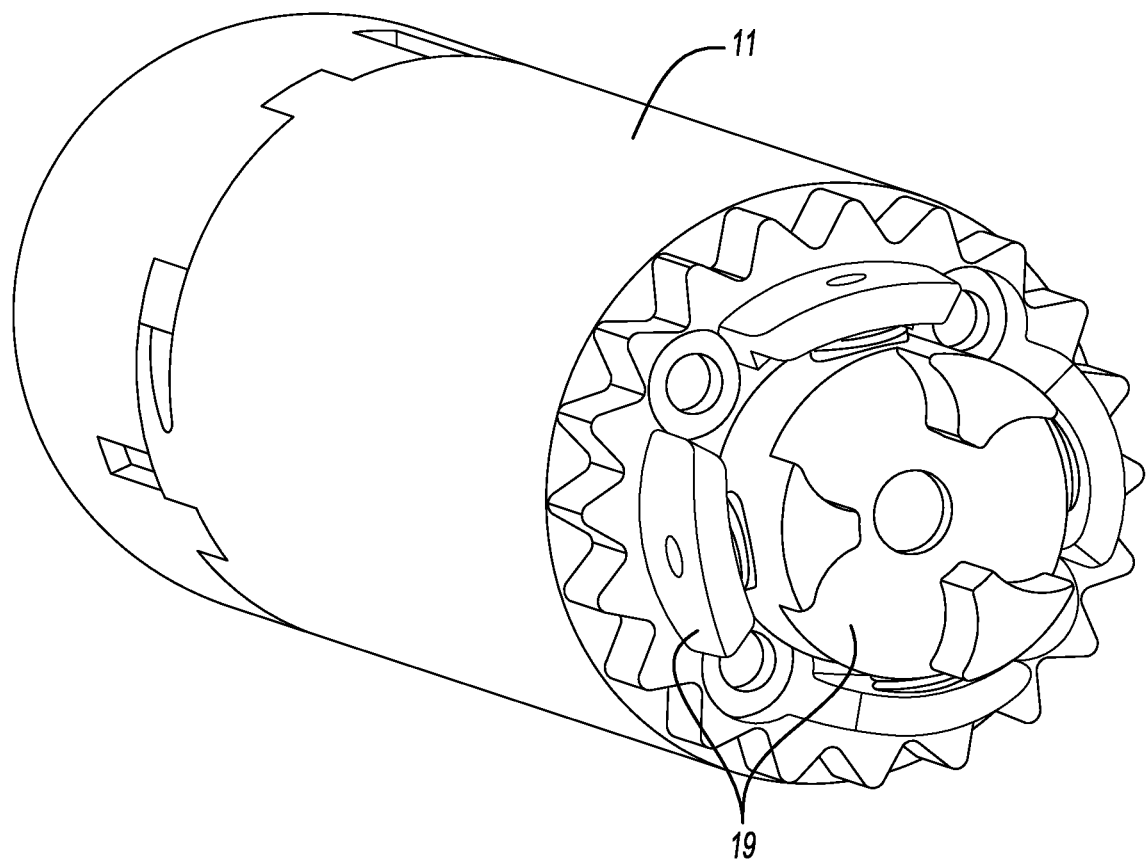
FIG. 8 is a perspective view of the cogging device mounted to the DC motor.
Figure 9:
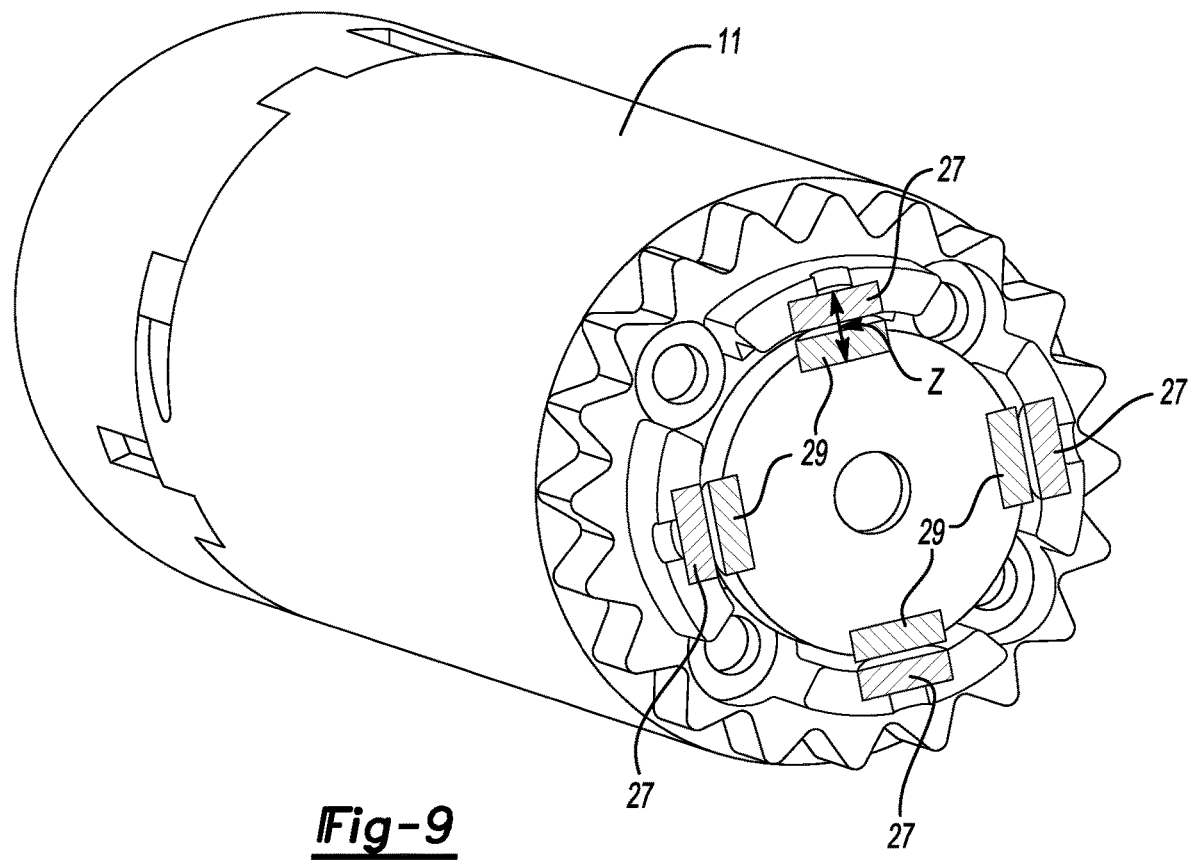
FIG. 9 is a perspective schematic partially cutaway view showing the opposing device magnets aligned and the attractive force between opposing magnets of the cogging device.
Figure 10:
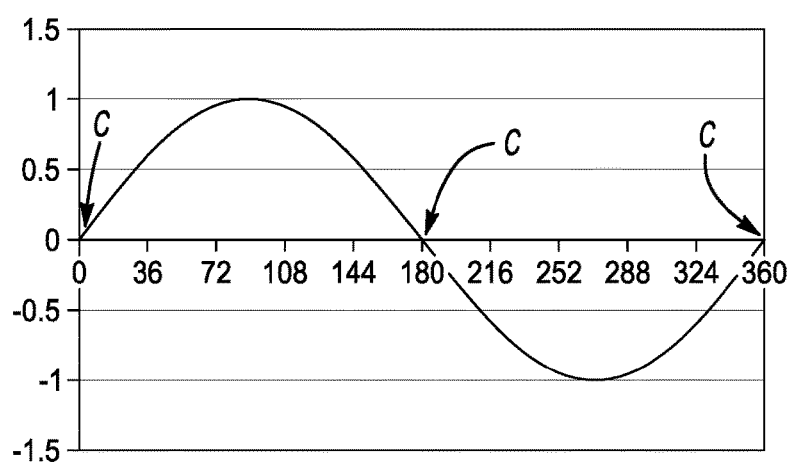
FIG. 10 illustrates the minimum torque generated when the opposing magnets of the cogging device are aligned as in FIG. 9.

Referring to FIGS. 8 and 9, in order to enhance the cogging effect of a typical DC motor, a torque increasing cogging device 19 may be fitted to the motor 11. The cogging device 19 comprises pairs of permanent device magnets 27, 29 in order to increase the cogging torque of the DC motor 11. The most desirable location for additional cogging torque is adjacent the motor 11 since such torque is multiplied by the gear ratio and gear train 15 efficiency to provide the door holding torque. An external set of magnets 27 align with an internal set of oppositely polarized or magnetized magnets 29. Since the oppositely polarized magnets attract, the cogging device 19 is in a stable position when the pairs of magnets 27, 29 are aligned. The attractive force between pairs of magnets 27, 29 is represented by the letter Z and the arrows in FIG. 9. Cogging torque is generated by displacing the magnets from their aligned positions. FIG. 10 again illustrates schematically the variation in torque as the pairs of magnets 27, 29 move into and out of alignment through 360 degrees of rotation. The torque is zero when the device magnets 27, 29 are aligned as in FIG. 9 as represented by point C. The maximum cogging force in FIG. 10 is greater than that in FIG. 7 owing to the addition of the effect of cogging device 19 to the cogging effect of the DC motor 11.

Figure 11:
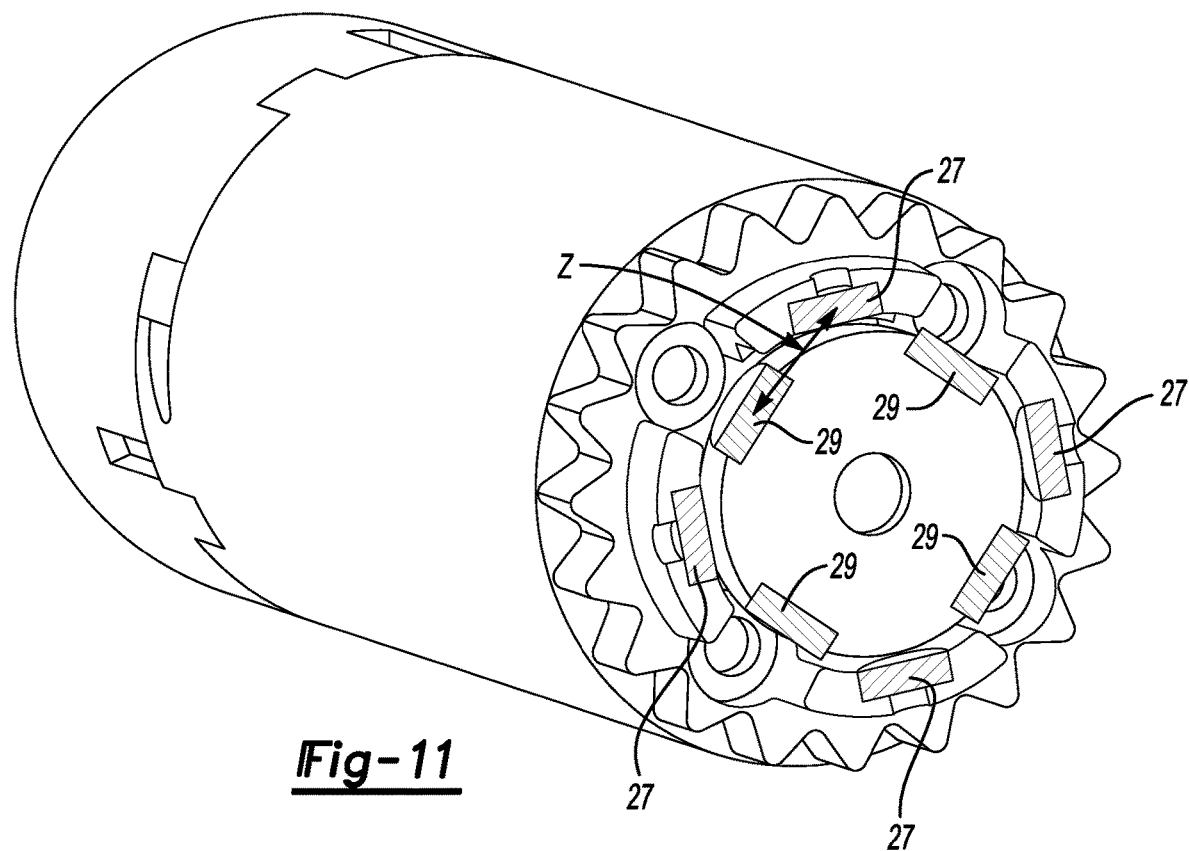
FIG. 11 is a perspective schematic partially cutaway view showing the opposing device magnets misaligned and the attractive force between opposing magnets of the cogging device.
Figure 12:
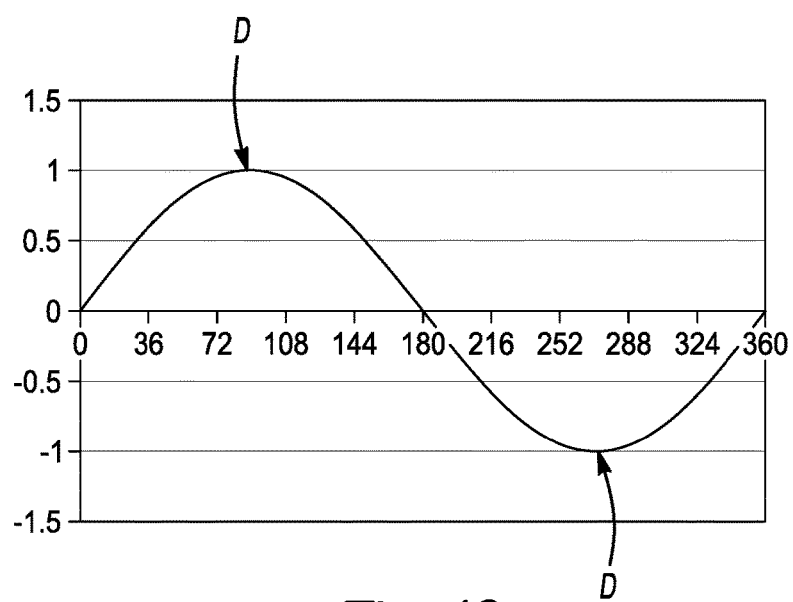
FIG. 12 illustrates the maximum torque generated when the opposing magnets of the cogging device are misaligned as in FIG. 11.

FIG. 11 illustrates the pairs of magnets 27, 29 at maximum misalignment. Again, the attractive force between oppositely polarized pairs of magnets is illustrated by the letter Z and the arrows. The potential energy is greatest when the magnets 27, 29 are at maximum displacement and misalignment. The cogging force in the maximum unstable position is shown by letter D in FIG. 12.

Figure 13:
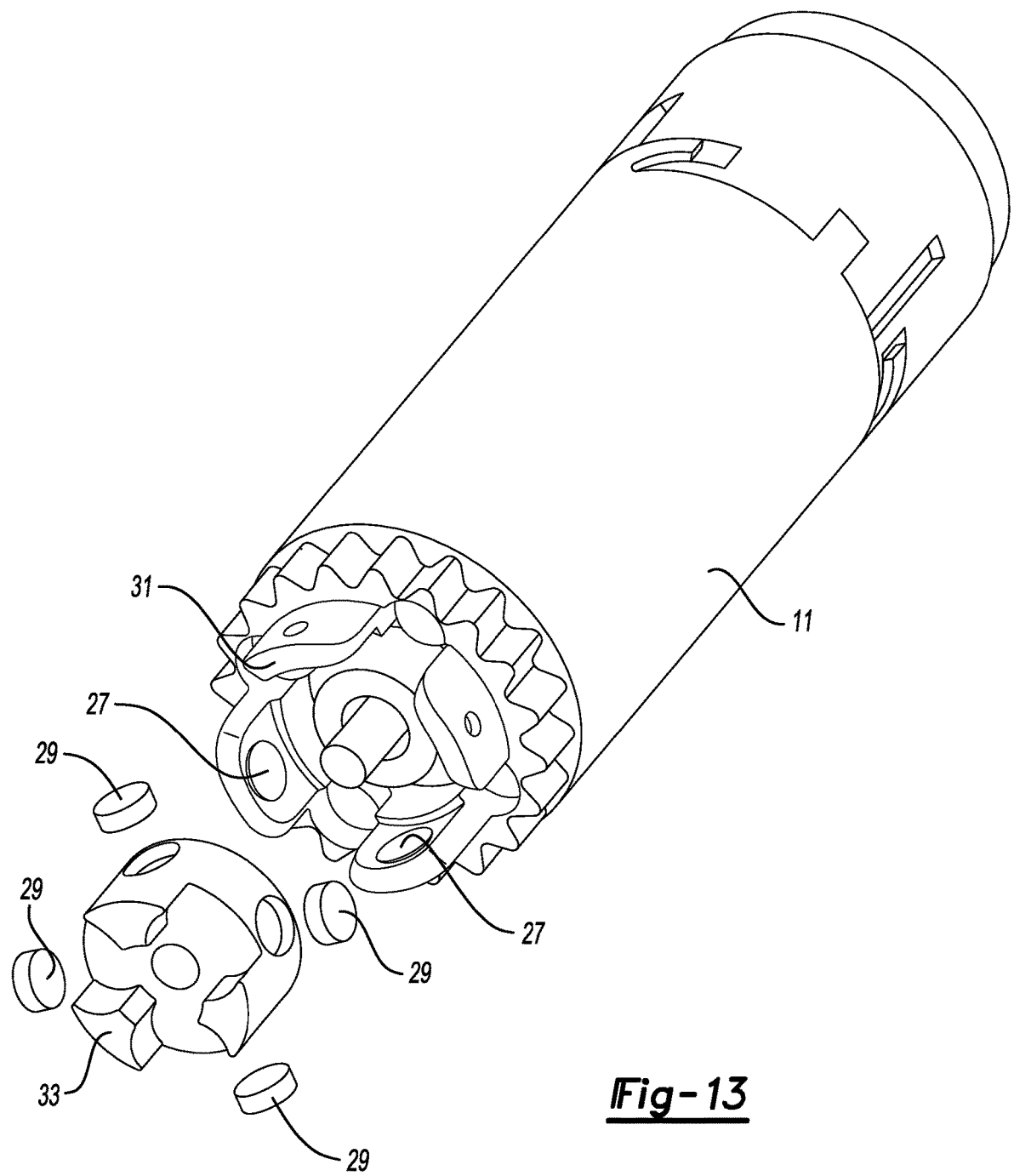
FIG. 13 is a perspective partially exploded view of the cogging device mounted to an end of the DC motor with a rotor, stator and individual permanent magnets.

FIG. 13 is a partial explosion view of the cogging device 19 which has its own stator 31, into which permanent magnets 27 are mounted, and rotor 33, into which permanent magnets 29 are mounted.

Figure 14:
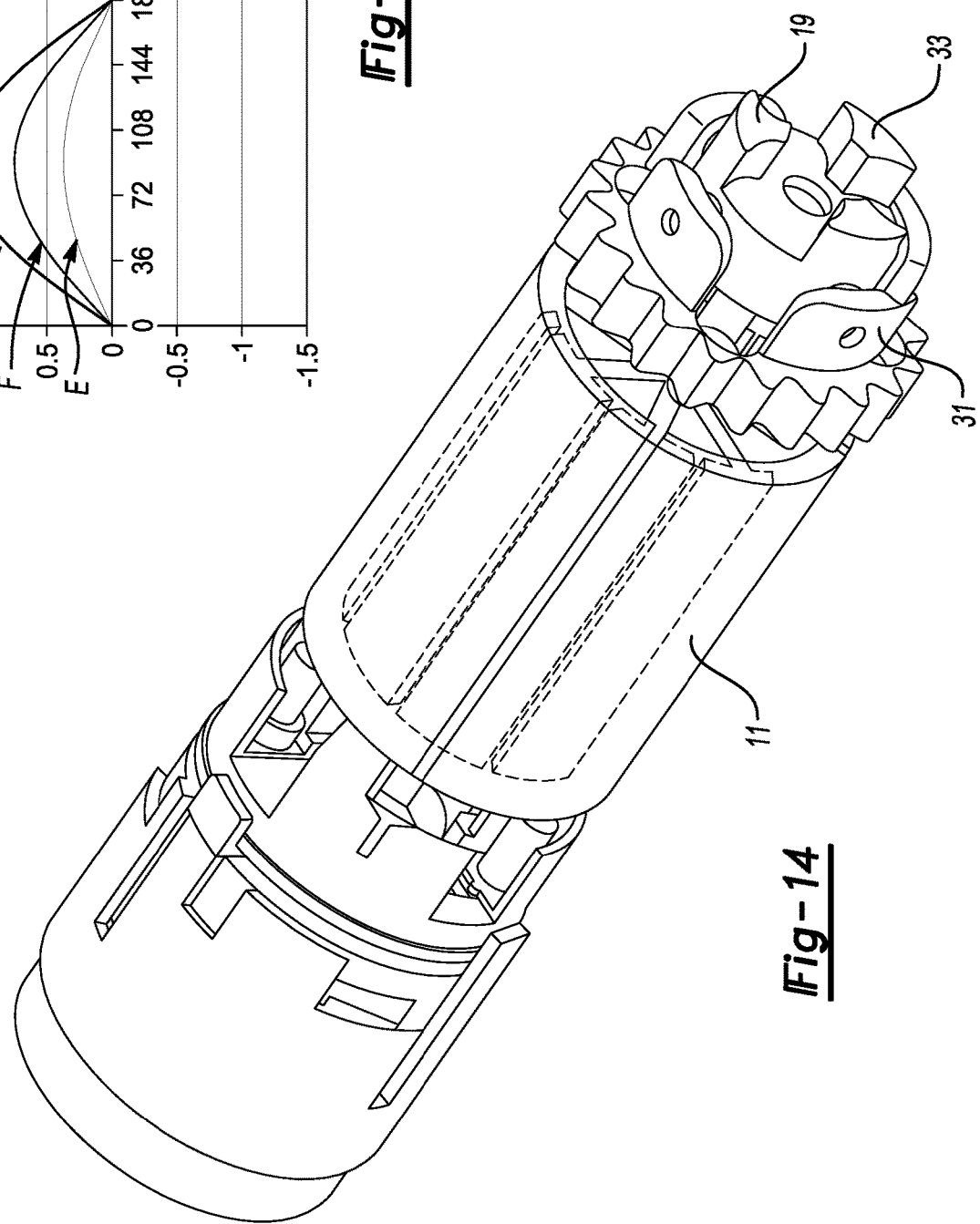
FIG. 14 is a perspective partially see-through view of the DC motor with the assembled cogging device mounted to an end thereof.

FIG. 14 illustrates an optimized orientation of the cogging device 19 with the external magnets 27 aligned to the DC motor 11 to increase the cogging torque of the system. Additional cogging torque may result in increased electrical current consumption of from about 2% to 50% depending on the speed of motor 11. In a typical motor operating range for the power door opening and closing function, however, the electrical current increase tends to be in the range of 5% to 8%. Thus, the additional cogging effect owing to the use of cogging device 19 does not adversely affect the operation of the DC motor 11.

Figure 15:
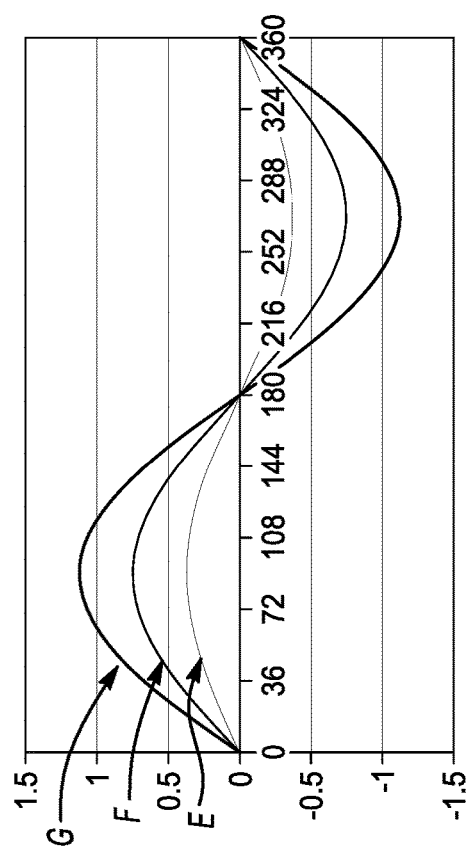
FIG. 15 illustrates the torque generated by the DC motor alone, by the cogging device alone and by the combination thereof.

FIG. 15 illustrates the motor torque E generated by the cogging effect of the DC electric motor 11, the cogging device torque F generated by the cogging device 19, and the total cogging torque G generated by the combined cogging effects of the electric motor 11 and the cogging device 19.

FIGS. 16A, B and C illustrate an alternative configuration of device magnets in the cogging device 19. Instead of employing discrete permanent magnets 27, 29, each with a single dipolarity, circular multi-pole magnets arranged concentrically may be employed. FIG. 16A illustrates such an array of multi-pole magnets with a circular external multi-pole magnet 35 comprising alternating North and South polarity segments concentric about a smaller diameter internal multi-pole magnet 37 also comprising alternating North and South polarity segments. In FIG. 16A, with opposing North and South polarity segments of the respective multi-pole magnets 35, 37 aligned, the position is stable. The attractive force between opposite polarity sections of the opposing multi-pole arrays is again represented by the letter Z. In FIG. 16B, with opposing North and South polarity segments of the respective multi-pole magnets 35, 37 misaligned, the position is unstable. The attractive force Z and the repulsive force R are not oriented coaxially. The stable position B of FIG. 16A corresponds to positions of minimum torque in FIG. 16C. The unstable position A corresponds to positions of maximum torque in FIG. 16C.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vehicle door checker integrated with a power drive unit for an automobile door comprising:
   a direct current permanent magnet electric motor configured to provide an inherent cogging torque;
   the motor comprising a central shaft;
   a cogging torque increase device mounted to the central shaft externally of the motor and configured to provide an additional cogging torque to the inherent cogging torque;
   the cogging torque increase device comprising pairs of oppositely magnetized permanent magnets comprising stator magnets and rotor magnets mounted coaxially in a stator and rotor respectively about the central shaft wherein the stator magnets and the rotor magnets shift into and out of alignment with each other as the central shaft is rotated; and
   such that the motor is held in multiple discrete stable positions corresponding to check positions of an automobile door.

2. The vehicle door checker integrated with a power drive unit of claim 1 further comprising:
   a. a gear system driven by the central shaft;
   b. at least one lever arm rotated by the gear system;
   c. a link arm configured to reciprocates under control of the lever arm to open and close a vehicle door.

3. The vehicle door checker integrated with a power drive unit of claim 2, wherein the oppositely magnetized pairs of magnets are located respectively on a multi-pole stationary outer magnet and a multi-pole rotating inner magnet.

4. The vehicle door checker integrated with a power drive unit of claim 1, wherein the oppositely magnetized pairs of magnets are located respectively on a multi-pole stationary outer magnet and a multi-pole rotating inner magnet.

5. The vehicle door checker integrated with a power drive unit of claim 1, wherein the stator magnets and the rotor magnets of the cogging torque increase device are separate from the electric motor.

* * * * *